United States Patent [19]

Bambousek et al.

[11] Patent Number: 4,630,567
[45] Date of Patent: Dec. 23, 1986

[54] SPRAY PAINT SYSTEM INCLUDING PAINT BOOTH, PAINT ROBOT APPARATUS MOVABLE THEREIN AND RAIL MECHANISM FOR SUPPORTING THE APPARATUS THEREOUT

[75] Inventors: Gerald J. Bambousek, Algonac; Donald S. Bartlett; Thomas D. Schmidt, both of Troy, all of Mich.

[73] Assignee: GMF Robotics Corporation, Troy, Mich.

[21] Appl. No.: 770,261

[22] Filed: Aug. 28, 1985

[51] Int. Cl.⁴ .............................................. B05B 15/12
[52] U.S. Cl. ................................... 118/323; 118/326; 118/DIG. 7; 98/115.2; 901/43
[58] Field of Search ................ 98/115.2; 55/DIG. 46; 118/326, 323, DIG. 7; 901/43, 49; 105/29 R; 104/93, 106, 109, 89, 165

[56] References Cited

U.S. PATENT DOCUMENTS

| | | | |
|---|---|---|---|
| 3,216,183 | 11/1965 | Larsson | 98/115.2 X |
| 3,478,720 | 11/1969 | Bok | 118/326 |
| 3,884,153 | 5/1975 | Sugimoto | 104/93 |
| 3,942,420 | 3/1976 | Marino | 118/326 X |
| 4,323,030 | 4/1982 | Lehmann | 118/326 |
| 4,342,536 | 8/1982 | Akeel et al. | 901/43 X |
| 4,414,252 | 11/1983 | Lampkin | 118/326 X |

FOREIGN PATENT DOCUMENTS 627915  9/1961  Canada ................ 104/165

*Primary Examiner*—Shrive P. Beck
*Attorney, Agent, or Firm*—Brooks & Kushman

[57] ABSTRACT

A spray paint system including a paint booth and paint robot apparatus movable within the paint booth and movably supported outside the paint booth is disclosed. The side walls of the paint booth have elongated openings formed adjacent the bottom of the paint booth to allow gooseneck-shaped saddle structures to extend therethrough. The saddle structures support paint robots on their respective elongated rail mechanisms. The side walls of the paint booth, together with the rail mechanisms defines stationary labyrinthian seals which isolate paint hoses, cables, bearings and ways from the booth environment. Each robot is mounted on its saddle structure by a hollow robot carriage. The robot carriage and saddle structures house the various cables, hoses and paint lines of their respective robot. Drive assemblies including racks mounted on their respective rail mechanisms drive the saddle structures along the elongated openings.

15 Claims, 4 Drawing Figures

SPRAY PAINT SYSTEM INCLUDING PAINT BOOTH, PAINT ROBOT APPARATUS MOVABLE THEREIN AND RAIL MECHANISM FOR SUPPORTING THE APPARATUS THEREOUT

TECHNICAL FIELD

This invention relates to spray paint sysems and, in particular, to spray paint systems, including paint booths and paint robot apparatus movable within such a paint booth and supported outside such a paint booth.

BACKGROUND ART

Many spray painting machines have been introduced to paint mass-produced items such as automotive bodies. Such paint spraying machines have typically been limited in their use in that they must be backed up by human operators, who must touch up areas missed by the machines. Such machines also tend to be wasteful of paint and are only designed to paint with horizontal and/or vertical paths on a reciprocator system. Coating an object fully, especially if it has complex contours, requires movements in depth as well as lateral movements. The use of a wrist is significant in that it is often necessary for an operator to angle a paint spray gun in a particular manner to deposit paint on a heavily contoured surface.

Many of the prior art spray painting machines include a battery of spray guns fed from large capacity, centralized paint reservoirs which manage to paint a large percentage of the exterior surface to be covered. Less accessible areas, such as wheel arches, the interiors of the trunk or engine compartment and door edges had to be painted by operators who looked for unpainted areas as the car body left the automatic painter.

Numerous prior art patents disclose painting machines including electrical painting apparatus such as the U.S. Patent to Chapman U.S. Pat. No. 2,858,947; the U.S. Patent to Shelley et al U.S. Pat. No. 3,007,097; the U.S. Patent to Pierson et al U.S. Pat. No. 3,481,499; the U.S. Patent to Richter U.S. Pat. No. 4,030,617; the U.S. Patent to Yoshio U.S. Pat. No. 4,113,115; the U.S. Patent to Burns et al U.S. Pat. No. 4,196,049; the U.S. Patents to Shum U.S. Pat. Nos. 4,398,863 and 4,407,625; the U.S. Patent to Jacot-Descombes et al U.S. Pat. No. 4,424,472 and the U.S. Patent to Gorman U.S. Pat. No. 4,424,473. The U.S. Patents to Pollard U.S. Pat. Nos. 2,213,108 and 2,286,571 both disclose electrical robots for paint spraying. The U.S. Patent to Stricker U.S. Pat. No. 4,170,751 likewise discloses an electric apparatus associated with paint spraying robots.

There are many reasons for using spraying robots to provide high-quality painted finishes on a mass-produced item. Robots are desirable in that they are able to cope with the hostile painting environment; they allow the painting process to proceed with less total energy being expended; and they improve paint quality which, in turn, eventually results in reduced material and labor costs. The above advantages are particularly important in painting car bodies where production rates are expected to be high, and there is a relatively small amount of time available for the paint to be applied and completed in not one, but several coats.

A spraying robot can also be used in the enameling and/or powdering of surfaces. For example, application of vitreous enamel to plastic bathtubs utilizes many of the same spray techniques as used in the application of paint to an automotive body.

Robots which have been used for spray painting comprise continuous path machines which emulate the action of a human operator. Such robots are typically taught by having an expert painter lead each robot in its learning mode through an actual paint job.

Paint robots have been used for some time to apply paint to large parts such as car bodies. Robots, in general, have a small work envelope or area within which they can move. Therefore, to increase the work envelope large enough to paint these large parts, the robot has to be mounted on either a rail, table or slide by means of a carriage. Of the three methods of obtaining the larger work envelope, the rail is preferred because a rail occupies much less space than tables or slides and the rail does not create and/or distribute dust as much as tables or slides. An example of such a system is shown in the U.S. Patent to Bartlett et al U.S. Pat. No. 4,312,535.

The extra increase in work envelope provided by one of these three devices allows the robot to paint one side of an entire car with the car either stationary or moving. If the car is moving, the extra axis tracks the car as it moves through the booth. By adding an additional rail, table or slide on the opposite side of the booth, both sides of the car can be painted.

The average spray booth in the automotive industry has been standardized to have a relatively small width. This small width typically restricts the size and movements of any robot which is to be used in such a spray booth.

The area within any paint spray booth must be free from any shelves, pockets, loose hoses or standard street clothing because they collect and/or distribute dust or lint. Any dust or lint in the area will find its way onto the car or large object being painted which, in turn, ruins the paint job.

The top or front of a typical rail is usually covered with a "way cover" which connects the moving carriage to the ends of the rails. This cover is required to protect the bearings, ways, and drive mechanism from ths hostile paint environment. The way cover comes in a variety of types, including telescopic tubes or plates, accordian and window shade. Way covers can be made of either an elastomer such as rubber or a sheet of stainless steel.

Way covers have traditionally been a high maintenance item for paint shops. The paint tends to accumulate on them causing the adjacent layers of the material to stick together, eventually causing fatigue in the cover. As the way cover moves and scrapes itself, the paint and dust may fall on the freshly painted car body resulting in defects. The defects require sanding, cleaning, and repainting.

Most paint booths are of a down-draft type which means that the air blows through filters in the top of a paint booth, around the car body and out the bottom of the paint booth. The rail is an obstruction to the air flow and causes an increase in air speed which, in turn, causes a partial vacuum in front of the rail. The partial vacuum may cause loose paint particles from the way cover to be deposited on the car body. The rail also causes turbulent air flow which upsets the streamlines in the booth and increases the chance of getting dirt on the car body. The volume of circulated air is rather large and requires a substantial amount of energy to circulate, heat, cool and dehumidify it.

DISCLOSURE OF THE INVENTION

An object of the present invention is to provide an improved spray paint system, including a paint booth, a paint robot for painting within the spray paint booth, and a rail mechanism on which the robot is supported wherein the rail mechanism is located outside the paint booth.

Another object of the present invention is to provide an improved spray paint system including a paint booth having side walls, robots for painting both sides of an object located in the paint booth and a pair of spaced rail mechanisms located outside the side walls wherein the side walls have elongated openings adjacent to the bottom of the paint booth and wherein the lower ends of the side walls cooperate with the rail mechanism to provide a labyrinthian seal to protect certain contamination sensitive parts of the rail mechanism as well as cables, hoses and paint lines from the paint booth environment.

Yet still another object of the present invention is to provide an improved paint booth apparatus including a plurality of walls, including a pair of spaced side walls, each of which has an elongated opening formed adjacent the bottom of the apparatus to at least partially define a labyrinthian seal.

Another object of the present invention is to provide a spray paint robot apparatus including a paint robot, a robot carriage for supporting the robot thereon, a gooseneck-shaped saddle structure for supporting the carriage at one end thereof and adapted for sliding movement on a track mechanism at its opposite end and a drive assembly including a motor for driving the saddle structure on the tack mechanism.

In carrying out the above objects and other objects of the present invention, a spray paint system constructed in accordance with the present invention comprises a paint booth having walls defining an enclosed painting area and at least one track means located outside the painting area and in fluid communication therewith through at least one opening formed in the paint booth. The system further comprises at least one paint robot located within the painting area to paint a body disposed therein. The paint robot is movably supported on the track means outside of the painting area.

Further in carrying out the above objects and other objects of the present invention, a spray paint robot apparatus constructed in accordance with the present invention and adapted for sliding movement on an elongated track means comprises a paint robot adapted for spray painting within a painting area and a robot carriage for supporting the robot thereon. The apparatus further comprises a gooseneck-shaped saddle structure for supporting the carriage at one end thereof and adapted for sliding movement on the track means at the opposite end thereof. The drive assembly including a motor for driving the saddle structure on the track means is provided wherein the one end of the saddle structure is disposed below the opposite end of the saddle structure.

A paint booth apparatus constructed in accordance with the present invention includes a plurality of walls defining an enclosed painting area. The walls include a pair of spaced side walls. Each of the side walls has an elongated opening formed adjacent the bottom of the apparatus. Each of the side walls at least partially defines a labyrinthian seal. The apparatus further comprises a pair of spaced housings. Each of the housings is adapted to house an elongated track means therein adjacent its respective side wall. The interior of each of the housings is in fluid communication with the painting area. The housings are sealed to prevent escape of paint fumes from the interior of the housing to the ambient.

An elongated rail mechanism adapted to slidably support a spray paint robot thereon constructed in accordance with the present invention includes a top rail portion and a bottom rail portion. The top rail portion has an upper way mounted thereon adapted to slidably support the robot thereon. The bottom rail portion is connected to the top rail portion and has a lower way mounted thereon also adapted to slidably support the robot thereon. A rack adapted for driving engagement with a pinion gear is mounted on the top rail portion. A deflector plate is disposed between the upper and lower portions to protect the rack and the upper way from upwardly moving contaminants.

The advantages of a spray paint system including a spray paint robot, a paint booth and rail mechanism as constructed above are numerous. For example, because the rail mechanisms are outside of the paint booth environment there is no need for way covers which are a source of high maintenance and tend to shed paint on freshly painted car bodies. Also, because the rail mechanism are not in the paint booth environment, the operational life of each rail mechanism is lengthened and maintenance on the front of each rail mechanism is relatively easy because it is protected by the wall overhang of the labyrinthian seal. Also, removal of the rail mechanism from the booth environment results in a more streamlined air flow in the booth. This reduces air turbulence which normally tends to increase the chance of dirt getting on the bodies to be painted. Because the rail mechanisms are located outside of the paint booth, the car bodies may be painted in smaller booths which are not only more economical to build, but also require less energy to ventilate and air-condition.

Also, the claimed saddle structures and robot carriages allow routing of electric cables, hydraulic hoses and paint lines to their respective robots therethrough without being exposed to the paint booth environment. This results in increased operational life of such cables, hoses and lines and also eliminates the chance of getting dirt on the car body from the cables, hoses and lines. In summary, the car body is protected from dirt and/or lint and the rail mechanisms, cables, hoses and lines are protected from the paint body environment.

Other advantages of the present invention will be readily appreciated as the same becomes better understood by reference to the following detailed description when considered in connection with the accompanying drawings.

BEST MODE FOR CARRYING OUT THE INVENTION

Figure 1:
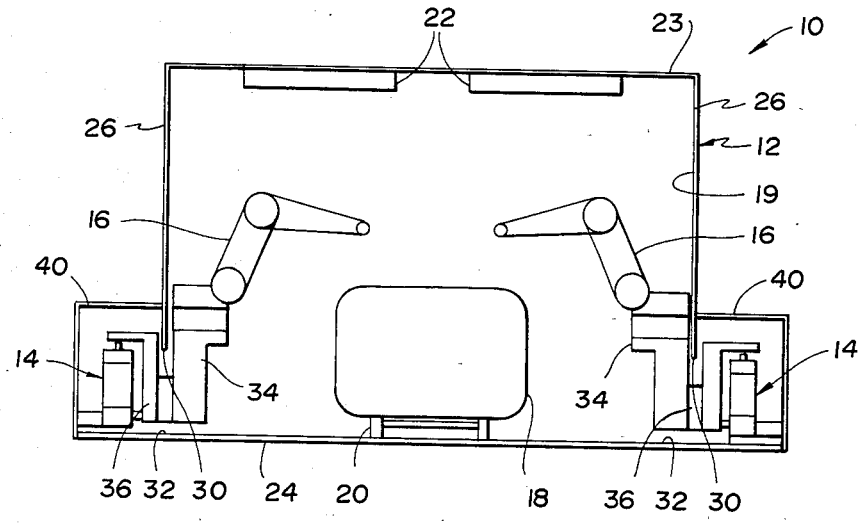
FIG. 1 is a schematic sectional view of a spray paint system constructed in accordance with the present invention with a car body to be painted.

Referring now to FIG. 1 there is illustrated a spray paint system constructed in accordance with the present invention at 10. The spray paint system 10 generally includes a specially constructed paint booth apparatus, generally indicated at 12, a pair of rail mechanisms, generally indicated at 14, spaced on opposite sides of the paint booth 12 and a pair of spray paint robots 16 supported on their respective rail mechanisms 14. The paint robots 16 are adapted to spray paint a body, such as a car body 18 located within an enclosed painting area 19 of the paint booth apparatus 12. The car body 18 is supported on a conventional, movable floor truck 20. Each floor truck 18 is part of a moving conveyor (not shown). The paint robots 16 are intended to be computer program controlled so that their movement and positions can be coordinated on the rail mechanism 14 during the painting operation.

As illustrated in FIG. 1, the paint booth apparatus 12 is of a down-draft type and has fliters 22 at a ceiling portion 23 thereof. Air blows through the filters 22 around the car body 18 and out the floor 24 of the paint booth apparatus 12 which is made up of a series of grates. The grates allow maintenance personnel and others to walk on the booth floor 24 to service the system 10 while minimizing the obstruction to the air flow in the paint booth apparatus 12.

The paint booth apparatus 12 also includes a pair of side walls 26 interconnected by the ceiling portion 23 to form the enclosed painting area 19. The ceiling portion 23 is typically spaced 12 to 14 feet from the floor 24. While exaggerated in FIGS. 1 and 5, the bottom portion 30 of each of the side walls 26 is preferably spaced only about four inches from the floor 24 to define a labyrinthian seal. An elongated flap or deflector plate 33 is mounted on each of the rail mechanisms 14 to further refine the labyrinthian seal.

Each of the paint robots 16 is supported on a hollow robot carriage 34 which, in turn, is supported on a hollow gooseneck-shaped saddle structure 36. Each of the saddle structures 36 is slidably mounted on its respective rail mechanism 14 to permit sliding movement of the paint robot 16 along the longitudinal length of the paint booth apparatus 12 as is described in greater detail hereinbelow.

Figure 2:
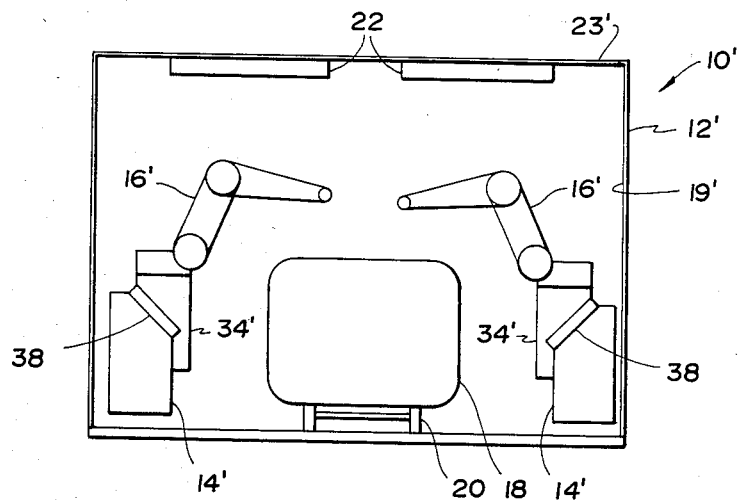
FIG. 2 is a view similar to FIG. 1 and illustrating a prior art spray paint system and a car body to be painted.

Referring now to FIG. 2, there is illustrated a prior art spray paint system 10' wherein paint robots 16' are mounted on their associated carriages 34' for sliding movement on rail mechanisms 14' within a paint booth 12'. Way covers 38 are provided on the top and front of the rail mechanism 14' to protect the associated bearings, ways and drive mechanisms from the hostile paint booth environment.

Figure 3:
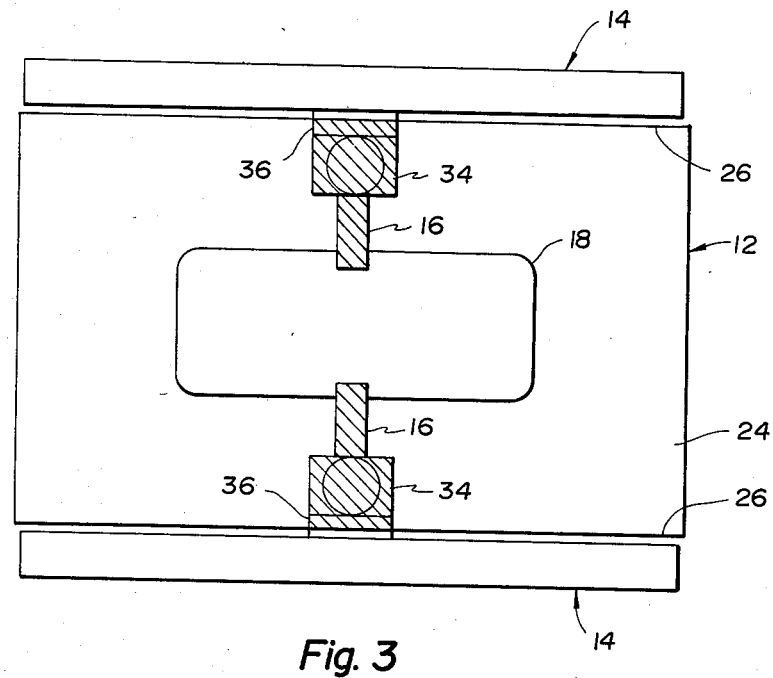
FIG. 3 is a schematic plan view of the spray paint system to the present invention with structures cross-hatched to indicate obstruction air flow areas.
Figure 4:
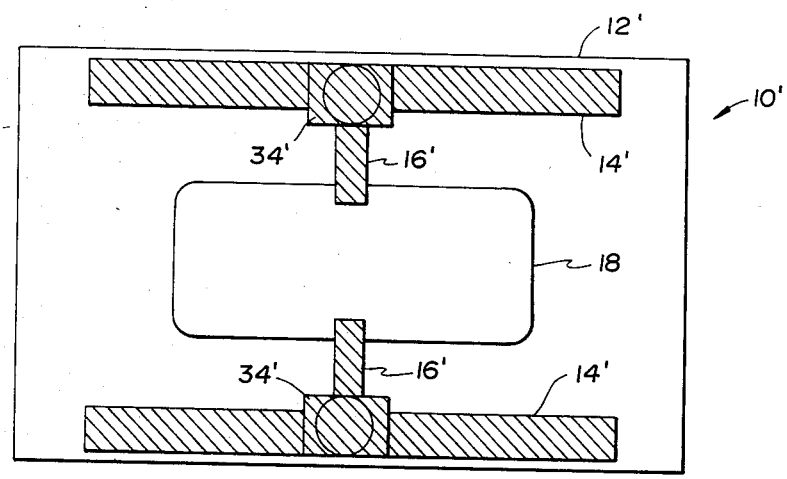
FIG. 4 is a view similar to FIG. 3 of the prior art spray paint system with the obstructed air flow areas cross-hatched.

Referring now to FIGS. 3 and 4, there is illustrated by cross-hatching the obstructed air flow areas in both the prior art system 10' and the spray paint system 10 of the present invention. As shown in FIG. 3 only the robots 16, the robot carriages 34 and a portion of each saddle structure 36 are obstructions to air flow. However, with reference to FIG. 4, it can be seen that not only are the robots 16' and the carriages 34' air flow obstructions, but also the rail mechanisms 14' are obstructions to air flow. The rail mechanisms 14' cause an increase in air speed which, in turn, causes a partial vacuum in front of each of the rail mechanisms 14'. Such a partial vacuum tends to pick up loose paint particles from the way covers 38 and may deposit them on the car body 18. The rail mechanisms 14' also cause turbulent air flow which upsets the streamlines in the paint booth 12' thereby increasing the change of getting dirt on the car body 18.

The system 10, as illustrated in FIG. 3, minimizes air flow obstructions in the paint booth apparatus 12 so as to reduce the volume of air required to be circulated within the paint booth apparatus 12. In this way, less energy is expended to circulate, heat, cool and dehumidify the circulating air.

The apparatus 12 includes a pair of elongated spaced housings 40 to house the rail mechanism 14 adjacent the side walls 26 of the paint booth apparatus 12. The housings 40 are typically sealed against the side walls 26 and the floor 24 to prevent the escape of paint fumes from the interiors of the housings 40 which fluidly communicate with the painting area 19 through the elongated openings 32.

Figure 5:
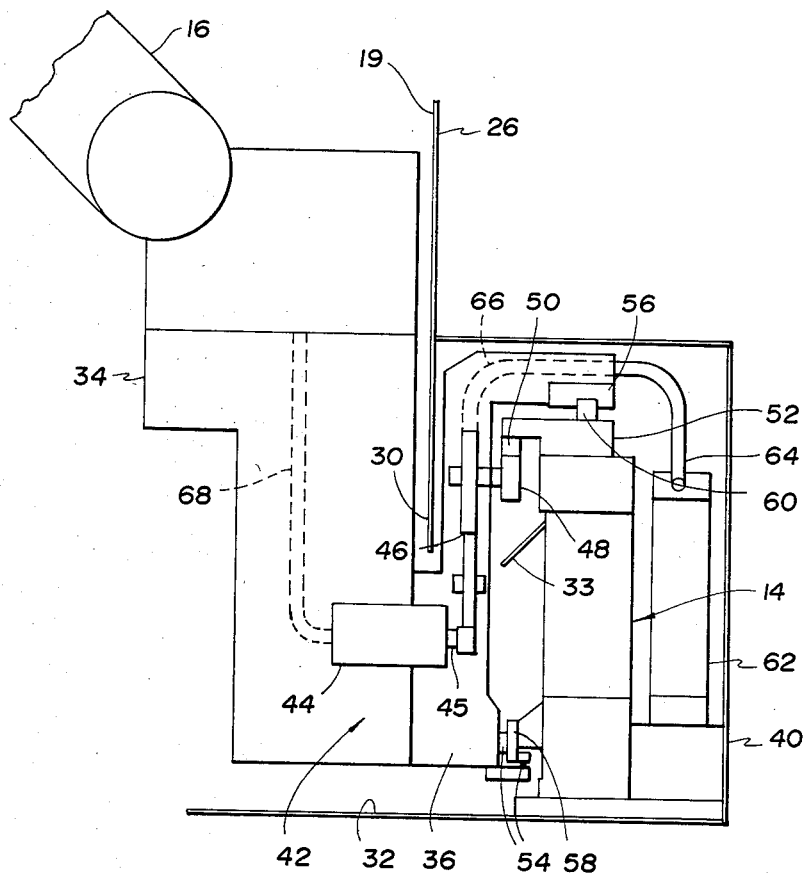
FIG. 5 is an enlarged schematic view, partially broken away and in cross-section illustrating the specific structures and interconnections of the present invention.

Referring now to FIG. 5, there is illustrated in detail apparatus for attaching and driving each of the gooseneck-shaped saddle structures 36 on its associated rail mechanism 14. In particular, each saddle structure 36 is powered by a drive assembly, generally indicated at 42, which includes a motor 44 supported on its carriage 34. The drive shaft 45 of the motor 44 is coupled through a gearing arrangement 46 to a pinion gear 48 which is in driving engagement with an elongated rack 50 mounted on the undersurface of a top portion 52 of its rail mechanism 14.

A bearing mechanism in the form of lower bearings 54 and upper bearings 56 slidably support each saddle structure 36 on lower and upper ways 58 and 60, respectively, mounted on its rail mechanism 14.

A cable, hose and line carrier 62 is also located within each of the housings 40 adjacent the rail mechanism 14 to carry the various cables, lines and hoses, collectively indicated at 64, which, in turn, supply the required paint, electrical power and hydraulic fluid to its robot 16. Both the saddle structure 36 and the carriage 34 have hollow portions at 66 and 68, respectively, to permit the cables, lines and hoses 64 to travel therethrough to its robot 16 thereby protecting the cables, lines and hoses 64 from the pain environment and also protecting the painted car body 18 from any dirt or other matter carried on the cables, lines and hoses 64 which may flake off upon flexing.

The advantages of a spray paint system, paint robot apparatus and a paint booth constructed in accordance with the above are numerous. For example, there is no need for way covers since the rail mechanisms are removed from the paint booth environment. Also, electric cables, hydraulic hoses and paint lines to the robot are not exposed to the paint booth environment, thereby increasing their life and eliminating the chance of getting dirt on the paint job when they move or flex. Also, the paint booth can be made smaller, thereby making the paint booth more economical to build and operate.

Also, turbulence within the paint booth is reduced which lowers the energy requirements for the circulating air. The reduced turbulence also reduces the amount of dirt stirred up from any one of the multiple sources of dirt within the paint booth environment.

The invention has been described in an illustrative manner, and it is to be understood that the terminology which has been used is intended to be in the nature of words of description rather than of limitation.

Obviously many modifications and variations of the present invention are possible in light of the above teachings. It is, therefore, to be understood that within the scope of the appended claims, the invention may be practiced otherwise than as specifically described.

What is claimed is:

1. A spray paint system comprising:
   a paint booth having walls defining an enclosed painting area;
   at least one track means located outside of said painting area and in fluid communication therewith through at least one opening formed in said paint booth;
   at least one paint robot located within said painting area to paint a body disposed therein, said paint body robot being movably supported on said track means outside of the painting area; and
   sealing means for sealing said painting area at said opening, said sealing means including at least one labyrinthian seal.

2. The system as claimed in claim 1 further comprising at least one robot carriage located in said painting area for supporting said robot thereon, said carriage being supported on said track means.

3. The system as claimed in claim 2 further comprising at least one saddle structure extending through said opening, said saddle structure being supported on said track means and wherein said carriage is supported on said saddle structure.

4. The system as claimed in claim 3 further comprising at least one drive assembly, including a motor, for driving the saddle structure on said track means within said opening.

5. The system as claimed in claim 3 wherein said carriage and said saddle structure are hollow and further comprising at least one cable extending from outside the painting area through said carriage and said saddle structure and operatively connected to said robot.

6. The system as claimed in claim 1 further comprising at least one sealed housing for housing said track means to prevent the escape of paint fumes from the interior of the housing to the ambient.

7. The system as claimed in claim 1 further comprising two track means, two openings and two paint robots, each of said robots being movably supported on its respective track means and each of said track means being in fluid communication with the painting area through its respective opening on opposite sides of the paint booth.

8. The system as claimed in claim 1 wherein said labyrinthian seal is defined by one of said walls and by said track means.

9. The system as claimed in claim 1 or claim 8 wherein said track means is elongated in a first direction and wherein the opening is elongated in the same direction adjacent the bottom of the paint booth.

10. The system as claimed in claim 9 further comprising a saddle structure for slidably supporting the robot on said elongated track means.

11. The system as claimed in claim 8 further comprising a drive assembly for horizontally driving the saddle structure on said track means along said elongated opening.

12. The system as claimed in claim 11 wherein said drive assembly includes a drive member and a driven member mounted on said track means and in driving engagement with said drive member for moving the saddle structure in the first direction along said elongated opening.

13. The system as claimed in claim 12 wherein said drive member comprises a pinion gear and wherein said driven member comprises a rack spaced upwardly from said opening, said rack having a downwardly facing surface in driving engagement with said pinion gear.

14. The system as claimed in claim 10 including bearing means spaced upwardly from said elongated opening for slidably supporting the saddle structure on said track means.

15. A paint booth apparatus comprising:
   a plurality of walls defining an enclosed painting area and adapted to direct a flow of air therewithin, said walls including a pair of spaced side walls, each of said side walls having an elongated opening formed adjacent the bottom of the apparatus, each of said openings being elongated in a direction substantially perpendicular to the flow of air in the paint booth, each of said side walls at least partially defining a labyrinthian seal; and
   a pair of spaced housings, each of said housings being adapted to house an elongated track means therein adjacent its respective side wall, and the interior or each of said housings being in fluid communication with the painting area, the housings being sealed to prevent the escape of paint fumes from the interior of the housing to the ambient and wherein each of said labyrinthian seals opens into its respective housing in a direction substantially opposite the direction of the flow of air at its respective opening.

* * * * *